United States Patent
Zhang et al.

(10) Patent No.: US 10,889,982 B2
(45) Date of Patent: Jan. 12, 2021

(54) TRANSLATION-ROTATION HYBRID VIBRATION CONTROL SYSTEM FOR BUILDINGS

(71) Applicant: Qingdao University of Technology, Shandong (CN)

(72) Inventors: Chunwei Zhang, Shandong (CN); Hao Wang, Shandong (CN)

(73) Assignee: Qingdao University of Technology, Qingdao (CN)

( * ) Notice: Subject to any disclaimer, the term of this patent is extended or adjusted under 35 U.S.C. 154(b) by 0 days.

(21) Appl. No.: 16/930,281

(22) Filed: Jul. 15, 2020

(65) Prior Publication Data

US 2020/0347591 A1 Nov. 5, 2020

Related U.S. Application Data

(63) Continuation of application No. PCT/CN2019/105643, filed on Sep. 12, 2019.

(30) Foreign Application Priority Data

Feb. 1, 2019 (CN) .......................... 2019 1 0103427

(51) Int. Cl.
| | |
|---|---|
| *E04B 1/98* | (2006.01) |
| *H02B 1/54* | (2006.01) |
| *E04H 9/02* | (2006.01) |
| *F16F 15/03* | (2006.01) |
| *F16F 15/18* | (2006.01) |

(52) U.S. Cl.
CPC ............. *E04B 1/98* (2013.01); *E04H 9/0215* (2020.05); *F16F 15/03* (2013.01); *F16F 15/18* (2013.01); *H02B 1/54* (2013.01); *F16F 2222/06* (2013.01)

(58) Field of Classification Search
CPC ... E04B 1/98; F16F 15/18; F16F 15/03; F16F 2222/06; H02B 1/54; E04H 9/0215; E04H 9/021; E04H 9/02; E02D 27/34; F16C 23/043
USPC .................................. 52/167.1, 167.2, 167.4
See application file for complete search history.

(56) References Cited

U.S. PATENT DOCUMENTS 4,793,105 A * 12/1988 Caspe ....................... E04H 9/02
  52/167.2
5,382,008 A * 1/1995 Tyutinman .............. E04H 9/021
  248/584

(Continued)

FOREIGN PATENT DOCUMENTS

| CN | 101016758 A | 8/2007 |
|---|---|---|
| CN | 104563294 A | 4/2015 |

(Continued)

*Primary Examiner* — Jessie T Fonseca
(74) *Attorney, Agent, or Firm* — Wayne & Ken, LLC; Tony Hom

(57) ABSTRACT

There is provided a translation-rotation hybrid vibration control system for buildings, which includes a translation control unit and a rotation control unit. The translation control unit is provided on an external building structure. The rotation control unit is provided above the translation control unit. The translation control unit includes a fixed base, a first track plate, a first movable plate, a second track plate and a second movable plate. The rotation control unit includes a force-transfer base, a drive, a reducer, an output shaft, a rotary plate and a flange.

6 Claims, 4 Drawing Sheets

(56) References Cited

U.S. PATENT DOCUMENTS

| | | | | |
|---|---|---|---|---|
| 6,085,473 A * | 7/2000 | Teramachi | E04H 9/023 | 52/167.1 |
| 6,164,022 A * | 12/2000 | Ishikawa | B23Q 1/48 | 52/167.1 |
| 6,385,917 B1 * | 5/2002 | Konomoto | E04H 9/021 | 52/167.1 |
| 6,631,593 B2 * | 10/2003 | Kim | E04H 9/023 | 248/562 |
| 8,307,586 B2 * | 11/2012 | Tsai | E04H 9/023 | 52/167.9 |
| 9,506,265 B1 * | 11/2016 | Lee | F16C 29/046 | |
| 10,024,074 B1 * | 7/2018 | Stevig | E04H 9/023 | |
| 2005/0055896 A1 * | 3/2005 | Teramachi | E04H 9/023 | 52/167.1 |
| 2006/0000159 A1 * | 1/2006 | Tsai | E04H 9/023 | 52/167.4 |
| 2006/0125161 A1 * | 6/2006 | Tsai | E02D 27/34 | 267/136 |
| 2006/0272225 A1 * | 12/2006 | Tsai | E04H 9/023 | 52/167.1 |
| 2007/0125930 A1 * | 6/2007 | Tsai | E04H 9/023 | 248/580 |
| 2007/0130848 A1 * | 6/2007 | Tsai | E04H 9/023 | 52/167.7 |
| 2008/0120927 A1 * | 5/2008 | Tsai | E04H 9/023 | 52/167.4 |
| 2019/0063063 A1 * | 2/2019 | Mechineau | E04H 9/0215 | |

FOREIGN PATENT DOCUMENTS

| | | |
|---|---|---|
| CN | 205475808 U | 8/2016 |
| CN | 108457514 A | 8/2018 |
| CN | 209509217 U | 10/2019 |
| JP | H11125027 A | 5/1999 |

* cited by examiner

TRANSLATION-ROTATION HYBRID VIBRATION CONTROL SYSTEM FOR BUILDINGS

CROSS-REFERENCE TO RELATED APPLICATIONS

This application is a continuation of International Patent Application No. PCT/CN2019/105643, filed on Sep. 12, 2019, which claims the benefit of priority from Chinese Patent Application No. 201910103427.7, filed on Feb. 1, 2019. The content of the aforementioned applications, including any intervening amendments thereto, is incorporated herein by reference.

TECHNICAL FIELD

The present application relates to suppression of vibration in a system, and more particularly to a translation-rotation hybrid vibration control system for buildings.

BACKGROUND

In recent years, with the economic development and social progress, there are higher requirements for the living space and increased investment in infrastructure. Expressways, railways, bridges, high-rise buildings, large-span spatial structures, etc. are constantly being built. In addition, deep sea and deep space are being explored, resulting in rapid development of offshore platforms and space stations in a wider space. These spatial structures are inevitably subjected to various loads, such as static loads and dynamic loads, during the construction and subsequent use. The dynamic load caused by earthquake, wind, wave, current, ice, explosion, etc., is the main factor that adversely affects the spatial structures. The vibration of spatial structures under dynamic loads usually leads to fatigue and reliability problems. But in severe cases, the structure is damaged and even is unusable, which may cause casualties and property damage. During the use of the structures, the dynamic loads, such as earthquake-induced load, render the structure collapsed and unusable, or even if the structure is not collapsed, the equipment, decoration and installation system inside the structure are no longer serviceable after being destroyed, and sometimes, secondary disasters ensue, leading to huge security threats and economic loss to occupants.

On the other hand, with economic development and technical progress, the structure is required to have safety and durability apart from the usability. Occupants in the structures, need to feel safe and comfortable. For example, under the wind-induced load, the occupants at high level of the high-rise structure experience the vibration of the structure in the absence of shock absorption measures. The equipment and facilities inside the structure are even damaged when the structure vibrates under strong winds, which cannot offer the comfort to the occupants and poses a threat to the properties.

In order to solve various problems caused by the vibration of the structure, it is necessary to eliminate or reduce the vibration caused by external loads. In recent years, vibration control techniques develop rapidly due to intensive research in various fields, such as civil engineering, aerospace, automotive, machinery, marine engineering, military engineering. In the civil engineering, the structure appropriately provided with vibration control devices can effectively reduce the dynamic response of the structure, and reduce the damage or fatigue failure to the structure, so as to meet the safety and comfort requirements for the occupants, reasonably balancing safety, economy and reliability. A large number of studies have shown that there are remarkable effects and great significance to apply the vibration control technique in civil engineering, for example, the damage to the structure can be avoided or reduced to not only improve the disaster prevention performance of the structure, ensuring life and property safety, but also prolong the service life of the structure and reduce the maintenance cost of the structure, providing the comfort to the occupants to the utmost extent even when the structure is under extreme conditions.

In the civil engineering, the structural vibration control technique has four types: active, passive, semi-active and hybrid control. Where the passive control technique is relatively mature. The passive tuned energy absorbing device, such as tuned mass damper (TMD) and tuned liquid damper (TLD), has been applied in many structures in the civil engineering. The principle of the TMD control is to adjust the frequency of the substructure, i.e., the damper, to be consistent with or close to the main structure, i.e., the controlled structure, so as to make the substructure resonate with the main structure. Since the vibration energy of the main structure is dissipated through the internal damping mechanism of the substructure, the dynamic responses of the main structure are reduced to realize the vibration control. The passive control TMD system has stable and good control effects, which is shown in a lot of research and practical applications, for example, John Hancock Tower (Boston) that has 60 stories, Petronas Twin Towers (Kuala Lumpur, Malaysia) and Taipei 101 are provided with the TMD vibration control device to realize good vibration control.

The structure has complex and diverse movements, where the translational motion together with torsional oscillation is generally involved. However, in the case that the TMD system is adopted to control the oscillation of a suspension mass system, it is found that when the suspension direction of the structure is consistent with the motion direction of the oscillation of the structure, the TMD system can effectively control the vibration whether under the initial offset or simple harmonic load excitation input; when the TMD system is used to control the oscillation of the structure in another direction, that is, the suspension direction of the structure is perpendicular to the motion direction of the oscillation of the structure, the TMD system always fails to work no matter how to adjust the system parameters (such as the pendulum length of the structure, the location of the control device). After a lot of theoretical analysis and experimental exploration, it is concluded that the translational TMD control device can only control the translational motion of the structure and fail to control the torsional oscillation. The research has shown the basic reason of such failure, that is, the passive control devices such as TMD and TLD are in a centrifugal state and thus are out of function, at this time, the system mass (or water in the TLD tank) does not move at all, and even an active mass damper (AMD)/a drive has greatly reduced control efficiency, because the active control force of the control device needs to overcome the gravity component of the mass. However, it is common that the structure has the torsional oscillation, for example, the irregular buildings have torsional oscillation under wind load; the suspended structure swings; and the ocean platforms has the torsional oscillation under the coupling of waves, wind and ice. Therefore, it is required to design a special structural vibration/motion control device to automatically overcome or get rid of the influence (centrifugal force effect) of the gravity field on the control device itself or to decouple the operation/movement rules of the control device from the gravity field while keeping the self-vibration of the system away from the effect of the gravity. These two aspects can achieve the purpose of fully moving the control device, thereby allowing the control device to effectively control the structural vibration.

In summary, the existing structural vibration control device is indispensable in the civil engineering field and is of great significance to protect the life and property of the occupants in the structure. However, the existing structural vibration control device/system has the following shortcomings.

1) The translational TMD control device can only control the translational motion of the structure and fails to control the torsional oscillation.

2) The translational AMD control device can control the torsional oscillation, but it has an extremely low control efficiency and cannot meet the use requirements.

3) The passive rotational inertia tuned damper can effectively control the torsional oscillation motion, but its structure requires complex frequency modulation, which involves relatively low efficiency to control some complex structures, having poor performance, low robustness and controllability, and poor applicability.

The present application aims to overcome these shortcomings in the prior art.

SUMMARY

An object of this application is to provide a translation-rotation hybrid vibration control system for buildings, so as to solve the shortcomings in the prior art, for example, the translational TMD fails to control the torsional oscillation motion; the translational AMD control device has a low control efficiency and poor performance; and the passive tuned rotational inertia damper involves low robustness, complex frequency modulation and poor applicability. In the present application, the AMD movement and rotational inertia of the rotation movement of the system are controlled according to actual movement of the structure, so as to provide an appropriate force applied to the controlled structure, which controls both the translational vibration and torsional oscillation, thereby realizing the vibration control.

The technical solutions of the present application are described as follows.

The application provides a translation-rotation hybrid vibration control system for buildings, comprising a translation control unit and a rotation control unit;

wherein the translation control unit is provided on an external building structure; and the rotation control unit is provided above the translation control unit;

the translation control unit comprises a fixed base, a first track plate, a first movable plate, a second track plate and a second movable plate;

a first main guide rail is provided on the first track plate; a first auxiliary guide rail and a third auxiliary guide rail are respectively provided at two sides of the first main guide rail; a second main guide rail is provided on the second track plate; and a second auxiliary guide rail and a fourth auxiliary guide rail are respectively provided at two sides of the second main guide rail;

a first slider is provided on a bottom surface of the first movable plate to cooperate with the first main guide rail; and a second slider is provided on a bottom surface of the second movable plate to cooperate with the second main guide rail;

the first track plate is provided on the fixed base; and the first track plate and the first movable plate cooperate with each other through the first slider;

the second track plate is fixed on the first movable plate; the second main guide rail is perpendicular to the first main guide rail; and the second track plate and the second movable plate cooperate with each other through the second slider;

the rotation control unit comprises a force-transfer base, a drive, a reducer, an output shaft, a rotary plate and a flange;

the force-transfer base is fixed above the second movable plate; the drive is fixed on the force-transfer base; and the drive is a stepping motor or a servo motor; and the reducer is fixed on the drive, and is connected to the output shaft; and the output shaft is connected to the rotary plate via the flange.

In some embodiments, two ends of the first track plate are respectively provided with a stop block to limit the range of motion of the first movable plate; and two ends of the second track plate are respectively provided with a stop block to limit the range of motion of the second movable plate.

In some embodiments, a first coil and a first permanent magnet are provided in the first main guide rail; a second coil is provided in the first slider; and the first slider is movable in the first main guide rail by means of the first coil, the first permanent magnet and the second coil; and a third coil and a second permanent magnet are provided in the second main guide rail; a fourth coil is provided in the second slider; and the second slider is movable in the second main guide rail by means of the third coil, the second permanent magnet and the fourth coil.

In some embodiments, a cut-off device configured to cut off power for the translation control unit under an emergency is provided in the first main guide rail and the second main guide rail, respectively.

In some embodiments, a grating ruler is provided in the first auxiliary guide rail and the second auxiliary guide rail, respectively, to measure and output a linear displacement of the first movable plate or the second movable plate.

In some embodiments, a plurality of positioning holes are provided at a bottom of the third auxiliary guide rail and a bottom of the fourth auxiliary guide rail, respectively; the positioning holes are in alignment along the third auxiliary guide rail and the fourth auxiliary guide rail, respectively; a positioning pin that is retractable is provided at a position of the first movable plate and the second movable plate, respectively such that the positioning pin fits with one of the positioning holes to fix the translation control unit.

In some embodiments, the rotary plate is a disc or a ring.

In some embodiments, a slot is provided at a top surface of the force-transfer base; an encoder is provided in the slot and connected to an end of the drive; and the drive is coaxially connected to the reducer and the encoder, respectively.

In some embodiments, the translation-rotation hybrid vibration control system further comprises an external controller;

wherein the external controller is connected to an external sensor, the drive and the encoder, respectively.

Compared to the prior art, this application has the following beneficial effects.

1) Due to the combination of the translation control technique and torsional oscillation control technique, the control device mounted on the controlled structure can simultaneously control the translation and rotation of the structure.

2) By adopting the active control technique and utilizing the mode that multiple units cooperate with each other, the present application can ensure the control effect to the greatest extent and allow control force to be controllable, achieving different control effects depending on needs.

3) A drive and a linear drive are used in the system to output the control force without the complex process of designing frequency modulation, which avoids the control failure due to the limitation of the frequency modulation technique, having a wider application range.

4) The system of the present application has greater robustness and stable control effect without being greatly affected by the variation of the structural form and the external load.

Figure 1:
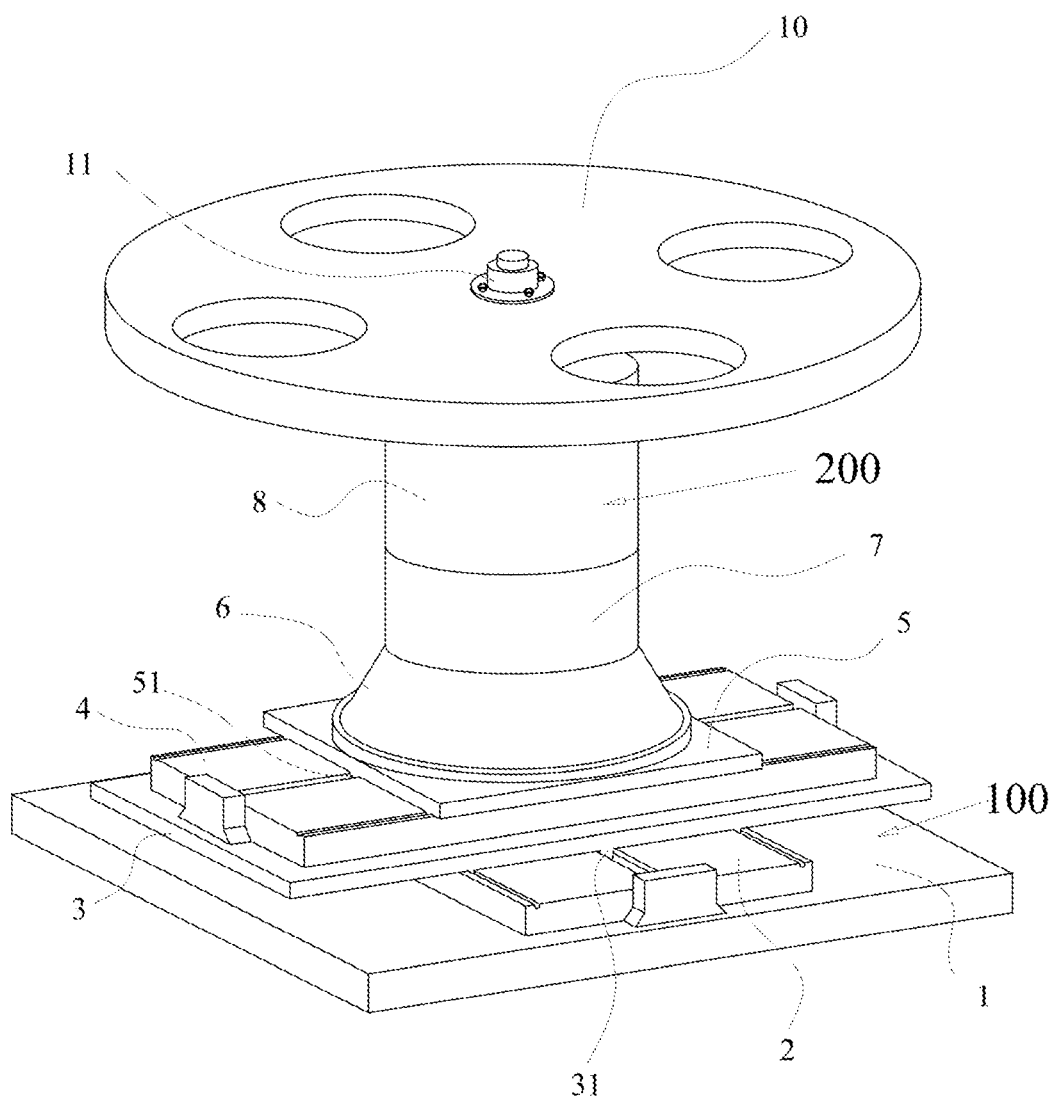
FIG. 1 is a schematic diagram of a translation-rotation hybrid vibration control system for buildings according to the present application.

In the drawings: 100, translation control unit; 200, rotation control unit; 1, fixed base; 2, first track plate; 21, first main guide rail; 211, first coil; 212, first permanent magnet; 22, first auxiliary guide rail; 23, third auxiliary guide rail; 3, first movable plate; 31, first slider; 311, second coil; 4, second track plate; 41, second main guide rail; 411, third coil; 412, second permanent magnet; 42, second auxiliary guide rail; 43, fourth auxiliary guide rail; 5, second movable plate; 51, second slider; 511, fourth coil; 6, force-transfer base; 7, drive; 8, reducer; 9, output shaft; 10, rotary plate; 11, flange; 12, stop block; 13, cut-off device; 14, grating ruler; and 15, positioning holes.

DETAILED DESCRIPTION OF EMBODIMENTS

This application is further described below with reference to the accompanying drawings.

Figure 2:
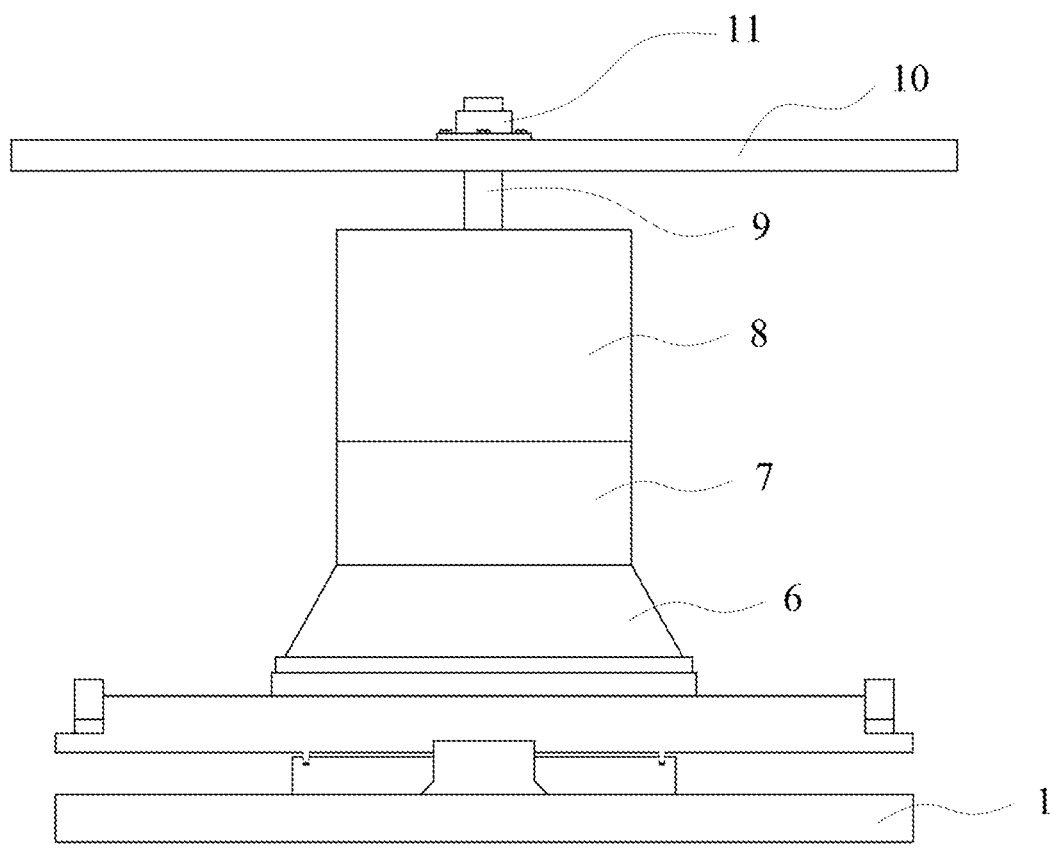
FIG. 2 is a front view of the translation-rotation hybrid vibration control system for buildings according to the present application.
Figure 3:
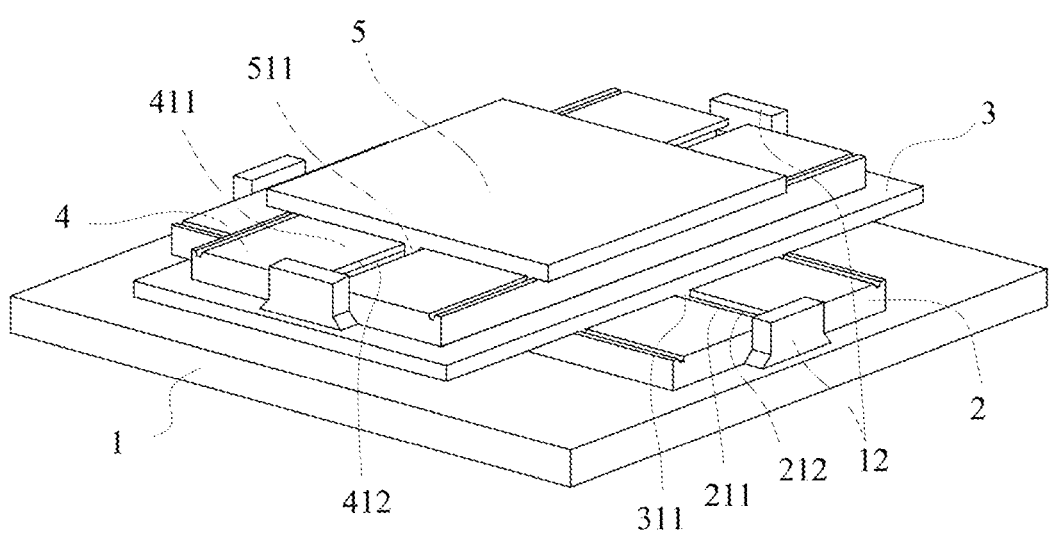
FIG. 3 is a schematic diagram of a translation control unit.
Figure 4:
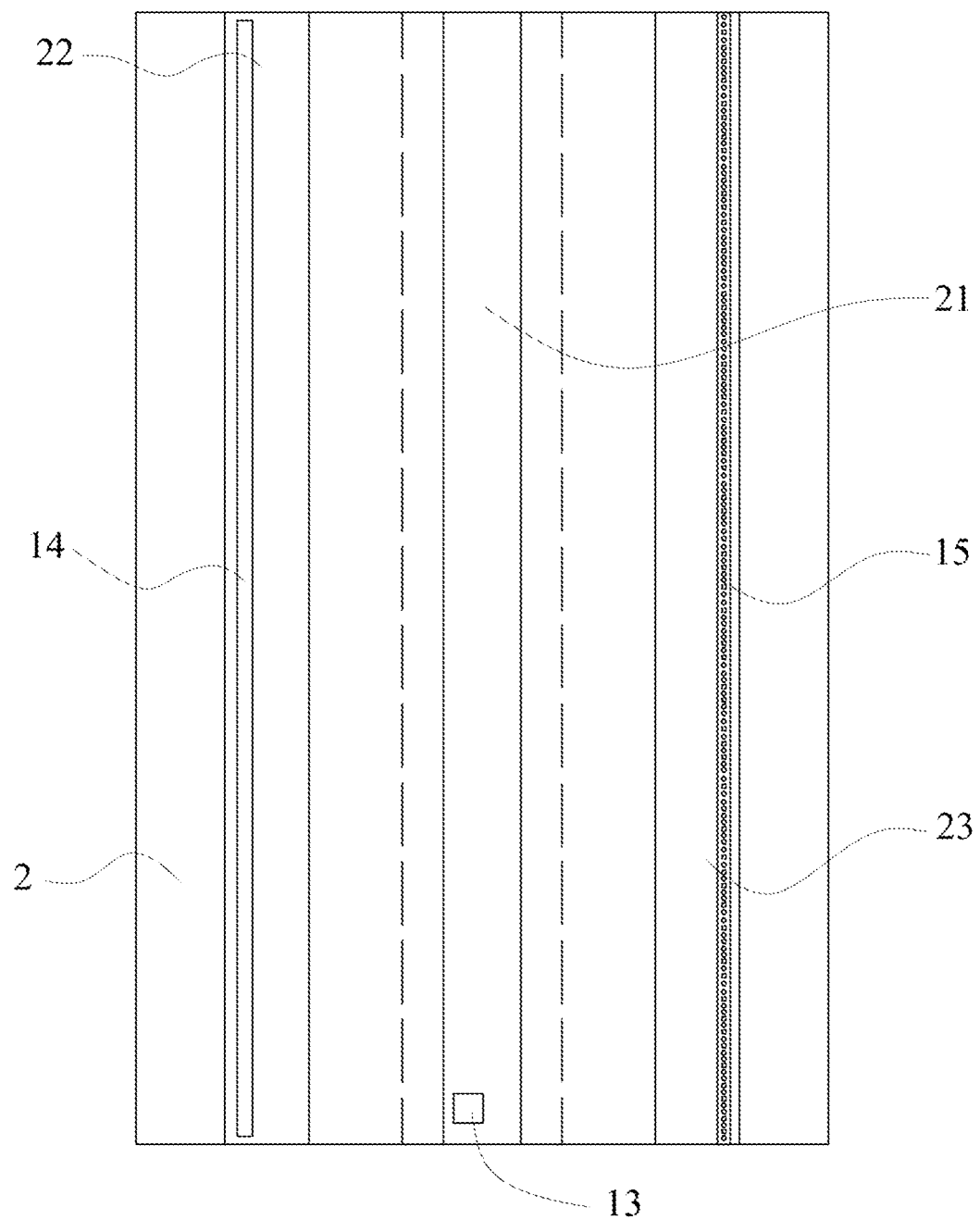
FIG. 4 is a schematic diagram of a first track plate.
Figure 5:
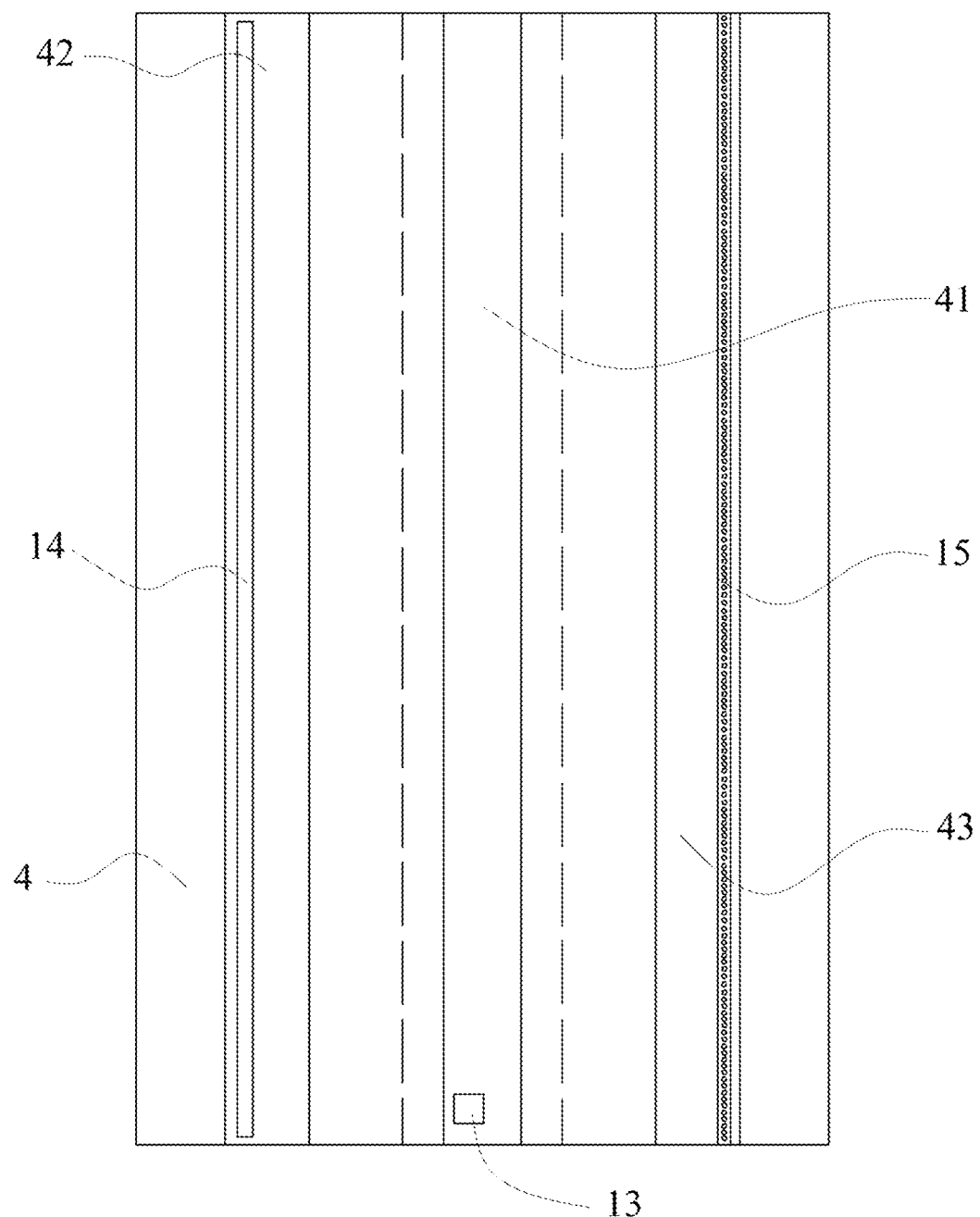
FIG. 5 is a schematic diagram of a second track plate.

As shown in FIGS. 1-5, the present application provides a translation-rotation hybrid vibration control system for buildings, including a translation control unit 100 and a rotation control unit 200; where the translation control unit 100 is provided on an external building structure; and the rotation control unit 200 is provided above the translation control unit 100;

the translation control unit 100 includes a fixed base 1, a first track plate 2, a first movable plate 3, a second track plate 4 and a second movable plate 5;

a first main guide rail 21 is provided on the first track plate 2; a first auxiliary guide rail 22 and a third auxiliary guide rail 23 are respectively provided at two sides of the first main guide rail 21; a second main guide rail 41 is provided on the second track plate 4; and a second auxiliary guide rail 42 and a fourth auxiliary guide rail 43 are respectively provided at two sides of the second main guide rail 41;

a first slider 31 is provided on a bottom surface of the first movable plate 3 to cooperate with the first main guide rail 21; and a second slider 51 is provided on a bottom surface of the second movable plate 5 to cooperate with the second main guide rail 41;

the first track plate 2 is provided on the fixed base 1; and the first track plate 2 and the first movable plate 3 cooperate with each other through the first slider 31;

the second track plate 4 is fixed on the first movable plate 3; the second main guide rail 41 is perpendicular to the first main guide rail 21; and the second track plate 4 and the second movable plate 5 cooperate with each other through the second slider 51;

the rotation control unit 200 includes a force-transfer base 6, a drive 7, a reducer 8, an output shaft 9, a rotary plate 10 and a flange 11;

the force-transfer base 6 is fixed above the second movable plate 5; the drive 7 is fixed on the force-transfer base 6; and the drive 7 is a stepping motor or a servo motor; and the reducer 8 is fixed on the drive 7, and is connected to the output shaft 9; and the output shaft 9 is connected to the rotary plate 10 via the flange 11. The rotary plate 10 is a disc or a ring.

An encoder is provided on the rotation control unit 200. One of a plurality of sensors is provided on the building structure. The structure forms and the movement forms determine the choice of the sensors and the location of the selected sensor. A favored sensor is required to fulfill the collection of data, such as the horizontal acceleration and the angular acceleration of the torsional pendulum of the structure.

Two ends of the first track plate 2 are respectively provided with a stop block 12 to limit the range of motion of the first movable plate 3. Two ends of the second track plate 4 are respectively provided with a stop block 12 to limit the range of motion of the second movable plate 5.

A first coil 211 and a first permanent magnet 212 are provided in the first main guide rail 21; a second coil 311 is provided in the first slider 31; and the first slider 31 is movable in the first main guide rail 21 by means of the first coil 211, the first permanent magnet 212 and the second coil 311; and a third coil 411 and a second permanent magnet 412 are provided in the second main guide rail 41; a fourth coil 511 is provided in the second slider 51; and the second slider 51 is movable in the second main guide rail 41 by means of the third coil 411, the second permanent magnet 412 and the fourth coil 511.

A cut-off device 13 configured to cut off power for the translation control unit 100 under an emergency is provided in the first main guide rail 21 and the second main guide rail 41, respectively.

A grating ruler 14 is provided in the first auxiliary guide rail 22 and the second auxiliary guide rail 42, respectively, to measure and output a linear displacement of the first movable plate 3 or the second movable plate 5.

A plurality of positioning holes 15 are provided at a bottom of the third auxiliary guide rail 23 and a bottom of the fourth auxiliary guide rail 43, respectively; the positioning holes 15 are in alignment along the third auxiliary guide rail 23 and the fourth auxiliary guide rail 43, respectively; a positioning pin that is retractable is provided at a position of the first movable plate 3 and the second movable plate 5, respectively. A hydraulic element is provided to control the positioning pin to extend or retract such that the translation control unit 100 is fixed when there is no vibration or only the rotation control unit 200 moves.

A slot is provided at a top surface of the force-transfer base 6; an encoder is provided in the slot and connected to an end of the drive 7; and the drive 7 is coaxially connected to the reducer 8 and the encoder, respectively.

The present application further includes an external controller which is connected to an external sensor, the drive 7 and the encoder, respectively. The external controller controls the drive 7 which further controls rotational direction and speed of the rotary plate 10, where some simple techniques involved therein, such as the signal transmission and processing, pertain to the prior art.

The use process of the present application is described as follows.

The translation-rotation hybrid vibration control system for buildings of the present application can simultaneously control the translational vibration and torsional oscillation of the structure. The rotation control unit 200 is fixed above the translation control unit 100, and the translation control unit 100 is provided on an external building structure, so as to control not only the common translational vibration, but also the torsional oscillation of the structure. The rotation control unit 200 functions to control the torsional oscillation and serves as a mass of the translation control unit 100. At the same time, the translation control unit 100 serves as a force transmission support of the rotation control unit 200. When the rotation control unit 200 works, a rotation control force generated by the system acts on the structure through the translation control unit 100 to realize the control effect. The acting force of the system makes the rotary plate 10 rotate through the drive 7 to produce a torsional oscillation control force. The translation control unit 100 drives the entire mass of the rotation control unit to generate horizontal control forces in two directions. The torsional oscillation control force is transferred through the force-transfer base 6 to the fixed base 1 and then acts on the building structure. The horizontal control forces directly act on the building structure through the fixed base 1.

When the building structure vibrates, the sensor transmits vibration signals to the controller, so that the vibrational state of the structure can be determined by the controller. If the vibration state is determined to be the torsional oscillation, the drive 7 is controlled to drive the rotary plate 10 to rotate at a certain acceleration, and such acceleration generates a force which acts on the force-transfer base 6 and then is applied to the controlled structure through the translation control unit 100, so as to control the vibration of the structure, weakening the torsional oscillation movement of the structure.

For the planar vibration, the drive 7 sends signals to the translation control unit 100. By using a linear motor, the first slider 31 below the first movable plate 3 performs acceleration or deceleration in the first main guide rail 21. The second slider 51 below the second movable plate 5 performs acceleration or deceleration in the second main guide rail 41. The grating ruler 14 measures and outputs the position of the first movable plate 3 or the second movable plate 5 in real time. The controller controls the moving speed and acceleration of the first movable plate 3 or the second movable plate 5 in real time. The counterforce generated by the movement of the first movable plate 3 and the second movable plate 5 reduces the planar vibration. At this time, the rotation control unit 200 which serves as the mass of the translation control unit 100 can assist the action of the translation control unit 100 and provide a counterforce to weaken the planar vibration of the building structure.

The translation control unit 100 and the rotation control unit 200 can actively control and weaken the planar vibration and rotation of the building structure, simultaneously.

When the building structure has only the torsional pendulum motion, the translation control unit 100 can stay stationary. A hydraulic element controls the positioning pin to extend, so that the positioning pin is stuck in one of the positioning holes 15 to lock the first movable plate 3 and the second movable plate 5, thereby fixing the translation control unit 100.

The above are preferred embodiments of the present application, which are not intended to limit the scope of the disclosure. Any replacements and improvements made by those skilled in the art without departing from the essential scope of the present application shall fall with the scope of the present application.

What is claimed is:

1. A translation-rotation hybrid vibration control system for buildings, comprising a translation control unit and a rotation control unit;
   wherein the translation control unit is provided on an external building structure; and the rotation control unit is provided above the translation control unit;
   the translation control unit comprises a fixed base, a first track plate, a first movable plate, a second track plate and a second movable plate;
   a first main guide rail is provided on the first track plate; a first auxiliary guide rail and a third auxiliary guide rail are respectively provided at two sides of the first main guide rail; a second main guide rail is provided on the second track plate; and a second auxiliary guide rail and a fourth auxiliary guide rail are respectively provided at two sides of the second main guide rail;
   a first slider is provided on a bottom surface of the first movable plate to cooperate with the first main guide rail; and a second slider is provided on a bottom surface of the second movable plate to cooperate with the second main guide rail;
   the first track plate is provided on the fixed base; and the first track plate and the first movable plate cooperate with each other through the first slider;
   the second track plate is fixed on the first movable plate; the second main guide rail is perpendicular to the first main guide rail; and the second track plate and the second movable plate cooperate with each other through the second slider;
   the rotation control unit comprises a force-transfer base, a drive, a reducer, an output shaft, a rotary plate and a flange; and
   the force-transfer base is fixed above the second movable plate; the drive is fixed on the force-transfer base; and the drive is a stepping motor or a servo motor; the reducer is fixed on the drive, and is connected to the output shaft; and the output shaft is connected to the rotary plate via the flange.

2. The translation-rotation hybrid vibration control system of claim 1, wherein two ends of the first track plate are respectively provided with a stop block to limit the range of motion of the first movable plate; and two ends of the second track plate are respectively provided with a stop block to limit the range of motion of the second movable plate.

3. The translation-rotation hybrid vibration control system of claim 1, wherein a first coil and a first permanent magnet are provided in the first main guide rail; a second coil is provided in the first slider; and the first slider is movable in the first main guide rail by means of the first coil, the first permanent magnet and the second coil; and
   a third coil and a second permanent magnet are provided in the second main guide rail; a fourth coil is provided in the second slider; and the second slider is movable in the second main guide rail by means of the third coil, the second permanent magnet and the fourth coil.

4. The translation-rotation hybrid vibration control system of claim 1, wherein a grating ruler is provided in the first auxiliary guide rail and the second auxiliary guide rail, respectively, to measure and output a linear displacement of the first movable plate or the second movable plate.

5. The translation-rotation hybrid vibration control system of claim 1, wherein a plurality of positioning holes are provided at a bottom of the third auxiliary guide rail and a bottom of the fourth auxiliary guide rail, respectively;
    and the positioning holes are in alignment along the third auxiliary guide rail and the fourth auxiliary guide rail, respectively.

6. The translation-rotation hybrid vibration control system of claim 1, wherein the rotary plate is a disc or a ring.

\* \* \* \* \*